United States Patent

[11] 3,594,560

[72] Inventor Thomas P. Stanley
Falls Church, Va.
[21] Appl. No. 788,754
[22] Filed Jan. 3, 1969
[45] Patented July 20, 1971
[73] Assignee Bell Telephone Laboratories Incorporated
Murray Hill, N.J.

[54] DIGITAL EXPANDOR CIRCUIT
3 Claims, 4 Drawing Figs.

[52] U.S. Cl. .......... 235/154, 340/347 DD
[51] Int. Cl. .......... G06f 5/00
[50] Field of Search .......... 235/154, 155, 156, 159, 160, 92; 340/347, 172.5; 179/15.55, 15

[56] References Cited
UNITED STATES PATENTS 3,037,701 6/1962 Sierra .......... 235/159
3,043,509 7/1962 Brown et al. .......... 235/156
3,236,999 2/1966 Hertz .......... 235/164
3,304,417 2/1967 Hertz .......... 235/164

*Primary Examiner*—Daryl W. Cook
*Assistant Examiner*—Gary R. Edwards
*Attorneys*—R. J. Guenther and E. W. Adams, Jr.

ABSTRACT: The digital expandor circuit disclosed operates on digital words which have been compressed in accordance with a prescribed format. By this format each of the compressed words contains two groups of digits, one group called the characteristic and another group called the mantissa. The digits of the characteristic are read into a counter circuit, and the digits of the mantissa together with a digit representing the most significant digit in the expanded digital word are read into a shift register. A common clock source controls both the counter and the shift register such that the mantissa group of digits is shifted in the register each time a counting signal is sent to the counter. In response to the values of the digits in the counter, logic circuitry regulates the counting signal and determines which of the digits in the shift register should be read to an output circuit to produce the expanded digital word.

INVENTOR
T. P. STANLEY
BY [signature]
ATTORNEY

FIG. 3A

| DECIMAL VALUE | 10 BIT BINARY WORD | | | | | | | | | | 6 BIT COMPRESSED WORD | | | | | |
|---|---|---|---|---|---|---|---|---|---|---|---|---|---|---|---|---|
| | 10 | 9 | 8 | 7 | 6 | 5 | 4 | 3 | 2 | 1 | A 6 | B 5 | C 4 | X 3 | Y 2 | Z 1 |
| 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 1 | 0 | 0 | 0 | 0 | 0 | 1 |
| 2 | 0 | 0 | 0 | 0 | 0 | 0 | 0 | 0 | 1 | 0 | 0 | 0 | 0 | 0 | 1 | 0 |
| 3 | 0 | 0 | 0 | 0 | 0 | 0 | 0 | 0 | 1 | 1 | 0 | 0 | 0 | 0 | 1 | 1 |
| 4 | 0 | 0 | 0 | 0 | 0 | 0 | 0 | 1 | 0 | 0 | 0 | 0 | 0 | 1 | 0 | 0 |
| 5 | 0 | 0 | 0 | 0 | 0 | 0 | 0 | 1 | 0 | 1 | 0 | 0 | 0 | 1 | 0 | 1 |
| 6 | 0 | 0 | 0 | 0 | 0 | 0 | 0 | 1 | 1 | 0 | 0 | 0 | 0 | 1 | 1 | 0 |
| 7 | 0 | 0 | 0 | 0 | 0 | 0 | 0 | 1 | 1 | 1 | 0 | 0 | 0 | 1 | 1 | 1 |
| 8 | 0 | 0 | 0 | 0 | 0 | 0 | 1 | 0 | 0 | 0 | 0 | 0 | 1 | 0 | 0 | 0 |
| 9 | 0 | 0 | 0 | 0 | 0 | 0 | 1 | 0 | 0 | 1 | 0 | 0 | 1 | 0 | 0 | 1 |
| 10 | 0 | 0 | 0 | 0 | 0 | 0 | 1 | 0 | 1 | 0 | 0 | 0 | 1 | 0 | 1 | 0 |
| 11 | 0 | 0 | 0 | 0 | 0 | 0 | 1 | 0 | 1 | 1 | 0 | 0 | 1 | 0 | 1 | 1 |
| 12 | 0 | 0 | 0 | 0 | 0 | 0 | 1 | 1 | 0 | 0 | 0 | 0 | 1 | 1 | 0 | 0 |
| 13 | 0 | 0 | 0 | 0 | 0 | 0 | 1 | 1 | 0 | 1 | 0 | 0 | 1 | 1 | 0 | 1 |
| 14 | 0 | 0 | 0 | 0 | 0 | 0 | 1 | 1 | 1 | 0 | 0 | 0 | 1 | 1 | 1 | 0 |
| 15 | 0 | 0 | 0 | 0 | 0 | 0 | 1 | 1 | 1 | 1 | 0 | 0 | 1 | 1 | 1 | 1 |
| 16 | 0 | 0 | 0 | 0 | 0 | 1 | 0 | 0 | 0 | 0 | 0 | 1 | 0 | 0 | 0 | 0 |
| 17 | 0 | 0 | 0 | 0 | 0 | 1 | 0 | 0 | 0 | 1 | 0 | 1 | 0 | 0 | 0 | 0 |
| 18 | 0 | 0 | 0 | 0 | 0 | 1 | 0 | 0 | 1 | 0 | 0 | 1 | 0 | 0 | 0 | 1 |
| 19 | 0 | 0 | 0 | 0 | 0 | 1 | 0 | 0 | 1 | 1 | 0 | 1 | 0 | 0 | 0 | 1 |
| 20 | 0 | 0 | 0 | 0 | 0 | 1 | 0 | 1 | 0 | 0 | 0 | 1 | 0 | 0 | 1 | 0 |
| 21 | 0 | 0 | 0 | 0 | 0 | 1 | 0 | 1 | 0 | 1 | 0 | 1 | 0 | 0 | 1 | 0 |
| 22 | 0 | 0 | 0 | 0 | 0 | 1 | 0 | 1 | 1 | 0 | 0 | 1 | 0 | 0 | 1 | 1 |
| 23 | 0 | 0 | 0 | 0 | 0 | 1 | 0 | 1 | 1 | 1 | 0 | 1 | 0 | 0 | 1 | 1 |
| 24 | 0 | 0 | 0 | 0 | 0 | 1 | 1 | 0 | 0 | 0 | 0 | 1 | 0 | 1 | 0 | 0 |
| 25 | 0 | 0 | 0 | 0 | 0 | 1 | 1 | 0 | 0 | 1 | 0 | 1 | 0 | 1 | 0 | 0 |
| 26 | 0 | 0 | 0 | 0 | 0 | 1 | 1 | 0 | 1 | 0 | 0 | 1 | 0 | 1 | 0 | 1 |
| 27 | 0 | 0 | 0 | 0 | 0 | 1 | 1 | 0 | 1 | 1 | 0 | 1 | 0 | 1 | 0 | 1 |
| 28 | 0 | 0 | 0 | 0 | 0 | 1 | 1 | 1 | 0 | 0 | 0 | 1 | 0 | 1 | 1 | 0 |
| 29 | 0 | 0 | 0 | 0 | 0 | 1 | 1 | 1 | 0 | 1 | 0 | 1 | 0 | 1 | 1 | 0 |
| 30 | 0 | 0 | 0 | 0 | 0 | 1 | 1 | 1 | 1 | 0 | 0 | 1 | 0 | 1 | 1 | 1 |
| 31 | 0 | 0 | 0 | 0 | 0 | 1 | 1 | 1 | 1 | 1 | 0 | 1 | 0 | 1 | 1 | 1 |
| 32 | 0 | 0 | 0 | 0 | 1 | 0 | 0 | 0 | 0 | 0 | 0 | 1 | 1 | 0 | 0 | 0 |
| 33 | 0 | 0 | 0 | 0 | 1 | 0 | 0 | 0 | 0 | 1 | 0 | 1 | 1 | 0 | 0 | 0 |
| 34 | 0 | 0 | 0 | 0 | 1 | 0 | 0 | 0 | 1 | 0 | 0 | 1 | 1 | 0 | 0 | 0 |
| 35 | 0 | 0 | 0 | 0 | 1 | 0 | 0 | 0 | 1 | 1 | 0 | 1 | 1 | 0 | 0 | 0 |
| 36 | 0 | 0 | 0 | 0 | 1 | 0 | 0 | 1 | 0 | 0 | 0 | 1 | 1 | 0 | 0 | 1 |
| 37 | 0 | 0 | 0 | 0 | 1 | 0 | 0 | 1 | 0 | 1 | 0 | 1 | 1 | 0 | 0 | 1 |
| 38 | 0 | 0 | 0 | 0 | 1 | 0 | 0 | 1 | 1 | 0 | 0 | 1 | 1 | 0 | 0 | 1 |
| 39 | 0 | 0 | 0 | 0 | 1 | 0 | 0 | 1 | 1 | 1 | 0 | 1 | 1 | 0 | 0 | 1 |

FIG. 3B

| | 10 | 9 | 8 | 7 | 6 | 5 | 4 | 3 | 2 | 1 | A | B | C | X | Y | Z |
|---|---|---|---|---|---|---|---|---|---|---|---|---|---|---|---|---|
| | | | | | | | | | | | 6 | 5 | 4 | 3 | 2 | 1 |
| 40 | 0 | 0 | 0 | 0 | 1 | 0 | 1 | 0 | 0 | 0 | 0 | 1 | 1 | 0 | 1 | 0 |
| 41 | 0 | 0 | 0 | 0 | 1 | 0 | 1 | 0 | 0 | 1 | 0 | 1 | 1 | 0 | 1 | 0 |
| 42 | 0 | 0 | 0 | 0 | 1 | 0 | 1 | 0 | 1 | 0 | 0 | 1 | 1 | 0 | 1 | 0 |
| 43 | 0 | 0 | 0 | 0 | 1 | 0 | 1 | 0 | 1 | 1 | 0 | 1 | 1 | 0 | 1 | 0 |
| 44 | 0 | 0 | 0 | 0 | 1 | 0 | 1 | 1 | 0 | 0 | 0 | 1 | 1 | 0 | 1 | 1 |
| 45 | 0 | 0 | 0 | 0 | 1 | 0 | 1 | 1 | 0 | 1 | 0 | 1 | 1 | 0 | 1 | 1 |
| 46 | 0 | 0 | 0 | 0 | 1 | 0 | 1 | 1 | 1 | 0 | 0 | 1 | 1 | 0 | 1 | 1 |
| 47 | 0 | 0 | 0 | 0 | 1 | 0 | 1 | 1 | 1 | 1 | 0 | 1 | 1 | 0 | 1 | 1 |
| 48 | 0 | 0 | 0 | 0 | 1 | 1 | 0 | 0 | 0 | 0 | 0 | 1 | 1 | 1 | 0 | 0 |
| 49 | 0 | 0 | 0 | 0 | 1 | 1 | 0 | 0 | 0 | 1 | 0 | 1 | 1 | 1 | 0 | 0 |
| 50 | 0 | 0 | 0 | 0 | 1 | 1 | 0 | 0 | 1 | 0 | 0 | 1 | 1 | 1 | 0 | 0 |
| 51 | 0 | 0 | 0 | 0 | 1 | 1 | 0 | 0 | 1 | 1 | 0 | 1 | 1 | 1 | 0 | 0 |
| 52 | 0 | 0 | 0 | 0 | 1 | 1 | 0 | 1 | 0 | 0 | 0 | 1 | 1 | 1 | 0 | 1 |
| 53 | 0 | 0 | 0 | 0 | 1 | 1 | 0 | 1 | 0 | 1 | 0 | 1 | 1 | 1 | 0 | 1 |
| 54 | 0 | 0 | 0 | 0 | 1 | 1 | 0 | 1 | 1 | 0 | 0 | 1 | 1 | 1 | 0 | 1 |
| 55 | 0 | 0 | 0 | 0 | 1 | 1 | 0 | 1 | 1 | 1 | 0 | 1 | 1 | 1 | 0 | 1 |
| 56 | 0 | 0 | 0 | 0 | 1 | 1 | 1 | 0 | 0 | 0 | 0 | 1 | 1 | 1 | 1 | 0 |
| 57 | 0 | 0 | 0 | 0 | 1 | 1 | 1 | 0 | 0 | 1 | 0 | 1 | 1 | 1 | 1 | 0 |
| 58 | 0 | 0 | 0 | 0 | 1 | 1 | 1 | 0 | 1 | 0 | 0 | 1 | 1 | 1 | 1 | 0 |
| 59 | 0 | 0 | 0 | 0 | 1 | 1 | 1 | 0 | 1 | 1 | 0 | 1 | 1 | 1 | 1 | 0 |
| 60 | 0 | 0 | 0 | 0 | 1 | 1 | 1 | 1 | 0 | 0 | 0 | 1 | 1 | 1 | 1 | 1 |
| 61 | 0 | 0 | 0 | 0 | 1 | 1 | 1 | 1 | 0 | 1 | 0 | 1 | 1 | 1 | 1 | 1 |
| 62 | 0 | 0 | 0 | 0 | 1 | 1 | 1 | 1 | 1 | 0 | 0 | 1 | 1 | 1 | 1 | 1 |
| 63 | 0 | 0 | 0 | 0 | 1 | 1 | 1 | 1 | 1 | 1 | 0 | 1 | 1 | 1 | 1 | 1 |
| 64 | 0 | 0 | 0 | 1 | 0 | 0 | 0 | 0 | 0 | 0 | 1 | 0 | 0 | 0 | 0 | 0 |
| 65 | 0 | 0 | 0 | 1 | 0 | 0 | 0 | 0 | 0 | 1 | 1 | 0 | 0 | 0 | 0 | 0 |
| 66 | 0 | 0 | 0 | 1 | 0 | 0 | 0 | 0 | 1 | 0 | 1 | 0 | 0 | 0 | 0 | 0 |
| 67 | 0 | 0 | 0 | 1 | 0 | 0 | 0 | 0 | 1 | 1 | 1 | 0 | 0 | 0 | 0 | 0 |
| 68 | 0 | 0 | 0 | 1 | 0 | 0 | 0 | 1 | 0 | 0 | 1 | 0 | 0 | 0 | 0 | 0 |
| 69 | 0 | 0 | 0 | 1 | 0 | 0 | 0 | 1 | 0 | 1 | 1 | 0 | 0 | 0 | 0 | 0 |
| 70 | 0 | 0 | 0 | 1 | 0 | 0 | 0 | 1 | 1 | 0 | 1 | 0 | 0 | 0 | 0 | 0 |
| 71 | 0 | 0 | 0 | 1 | 0 | 0 | 0 | 1 | 1 | 1 | 1 | 0 | 0 | 0 | 0 | 0 |
| 72 | 0 | 0 | 0 | 1 | 0 | 0 | 1 | 0 | 0 | 0 | 1 | 0 | 0 | 0 | 0 | 1 |
| 73 | 0 | 0 | 0 | 1 | 0 | 0 | 1 | 0 | 0 | 1 | 1 | 0 | 0 | 0 | 0 | 1 |
| 74 | 0 | 0 | 0 | 1 | 0 | 0 | 1 | 0 | 1 | 0 | 1 | 0 | 0 | 0 | 0 | 1 |
| 75 | 0 | 0 | 0 | 1 | 0 | 0 | 1 | 0 | 1 | 1 | 1 | 0 | 0 | 0 | 0 | 1 |
| 76 | 0 | 0 | 0 | 1 | 0 | 0 | 1 | 1 | 0 | 0 | 1 | 0 | 0 | 0 | 0 | 1 |
| 77 | 0 | 0 | 0 | 1 | 0 | 0 | 1 | 1 | 0 | 1 | 1 | 0 | 0 | 0 | 0 | 1 |
| 78 | 0 | 0 | 0 | 1 | 0 | 0 | 1 | 1 | 1 | 0 | 1 | 0 | 0 | 0 | 0 | 1 |
| 79 | 0 | 0 | 0 | 1 | 0 | 0 | 1 | 1 | 1 | 1 | 1 | 0 | 0 | 0 | 0 | 1 |

DIGITAL EXPANDOR CIRCUIT

BACKGROUND OF THE INVENTION

This invention relates generally to digital communication systems and, more particularly, to digital expandor circuits which operate on compressed digital words in companded digital communication systems.

In well-known digital communication systems employing pulse code modulation (PCM) the analog information signal is encoded, transmitted over a time divided transmission facility and then decoded at the receiver. In the encoding process the analog information signal is sampled at regularly occurring intervals. The amplitudes of these samples, which denote the amplitude of the analog signal at the instants of sampling, are then approximated by a number of discrete values, called quantum levels, so that each sample may be transmitted as a time divided pulse code. At the receiver the quantized samples are reconstructed from the pulse code and the analog information signal is in turn reconstructed from the samples.

The advantages of pulse code modulation systems are well known in the art. Unfortunately, however, the quantizing process described above necessarily results in distortion because the discrete quantum levels cannot exactly match the amplitudes of all the analog signal samples. This distortion, known as quantizing error or quantizing noise, must be accounted for in the transmission process.

As may be appreciated, the greatest error inherent in the quantizing process is equal to one-half the distance between the quantum levels above and below the amplitude of each signal sample. If one assumes, therefore, that the quantum levels vary from zero to a maximum amplitude in a series of uniform steps, then it follows that the smaller signal samples are susceptible to greater percentage error because each quantum step has a greater relative effect on the smaller samples than on the larger samples. Thus in uniform quantizing systems the quantizing noise, which is the ratio of the signal amplitude to the quantizing error, may be objectionably large when the amplitude of the signal is in the lower ranges.

In order to avoid this condition and hence to keep the quantizing noise within tolerable limits throughout the entire range of the signal a number of nonuniform quantizing schemes have been devised. In all of these systems the quantizing steps are effectively made smaller for the lower amplitude samples and larger for the higher amplitude samples. Essentially this process, called companding, reduces the quantizing error at the lower signal levels where it is objectionable at the price of increasing it at the higher levels where it can be tolerated.

Proper distribution of the quantizing steps throughout the signal range reduces the total number of steps required to transform a given analog signal into code form. This follows from the fact that the steps are used more efficiently when they are properly distributed. In this distribution process the signal is effectively compressed at the transmitter and expanded at the receiver. The term "companding," which describes the entire operation, results from a verbal contraction of the terms "compressing" and "expanding."

In early prior art companding systems the signal samples were compressed prior to and separate from the coding operation. Essentially, these systems attenuated the samples before passing them into a uniform coding circuit. Because the smaller samples were attenuated less, they were effectively given greater weight relative to the larger samples in the coding process.

Later methods combined the compression and coding operations. In these systems the coder was designed to give greater weight directly to the smaller samples in accordance with a given nonuniform coding characteristic. One of the most successful of these systems is the feedback coder which has been applied to produce a number of nonlinear coding characteristics, such as the hyperbolic, logarithmic and piecewise linear characteristics.

Despite the obvious differences in the techniques described above, it may be said that as a group the compressor circuits convert an analog quantity into digital quantity, while the expandor circuits reverse the process and convert from a digital to an analog quantity. In contrast, the present invention is concerned with companding systems which convert directly from one digital quantity to another digital quantity, i.e., with systems which do not operate directly on, or do not directly produce, an analog quantity. In such systems the companding operation is performed after coding and before decoding of the information signal.

The advantages of digital companding systems of this type are that the compression and expansion operations may be performed in a fully digital manner with basic digital circuitry. With the advancing state of the integrated circuit art, such fully digital systems are potentially capable of being more compact and less expensive than the systems described above. Because of their potential simplicity and compactness, efficient digital compressor and expandor circuits should enjoy widespread use in future time division communication systems.

SUMMARY OF THE INVENTION

The present invention is a digital expandor circuit which operates directly on digital words compressed in accordance with a prescribed format. The compressed digital words contain two groups of digits, one of which is termed the characteristic and the other of which is termed the mantissa in a fashion analogous to that used with logarithms. Essentially, the characteristic group of digits carries information as to the position of the most significant digits in the original uncompressed word while the mantissa carries information as to the numerical value of the significant digits closest to the most significant digit.

One circuit known in the prior art which produces compressed digital words in accordance with the above format is described for use in interplanetary spacecraft by D. H. Schaefer, Logarithmic Compression of Binary Numbers, Proceedings of I.R.E., July 1961, page 1,219. A variety of relatively complex digital circuits might be devised to operate on digital words of this type. In the alternative the compressed signal might be read into a computer which is specially programmed to expand and decode such a signal.

It is believed that digital expandor circuits will enjoy widespread use in future time division communication systems. Accordingly, it is an object of the present invention to provide an efficient, fully digital expandor circuit which operates on the above-described digital words so that practical digital-to-digital companding systems will be economically feasible.

In accordance with the invention the characteristic group of digits in the compressed word is read into a counter circuit, while the mantissa group of digits, together with a digit representing the most significant digit in the original word, are read into a shift register. A common clock source controls both the counter and the shift register such that the mantissa group of digits is shifted in the shift register each time a counting signal is sent to the counter. In response to the value of the digits in the shift register, logic circuitry regulates the counting signal and determines which of the digits in the shift register should be read to an output circuit to properly produce the expanded digital word. This expanded digital word can then be fed into a uniform decoder to reconstruct the original analog information signal.

BRIEF DESCRIPTION OF THE DRAWING

FIGS. 3*a*—3*b* are numerical charts illustrating the conversion of a 10-bit binary word to a six-bit binary word.

DETAILED DESCRIPTION OF THE DRAWINGS

Figure 1:
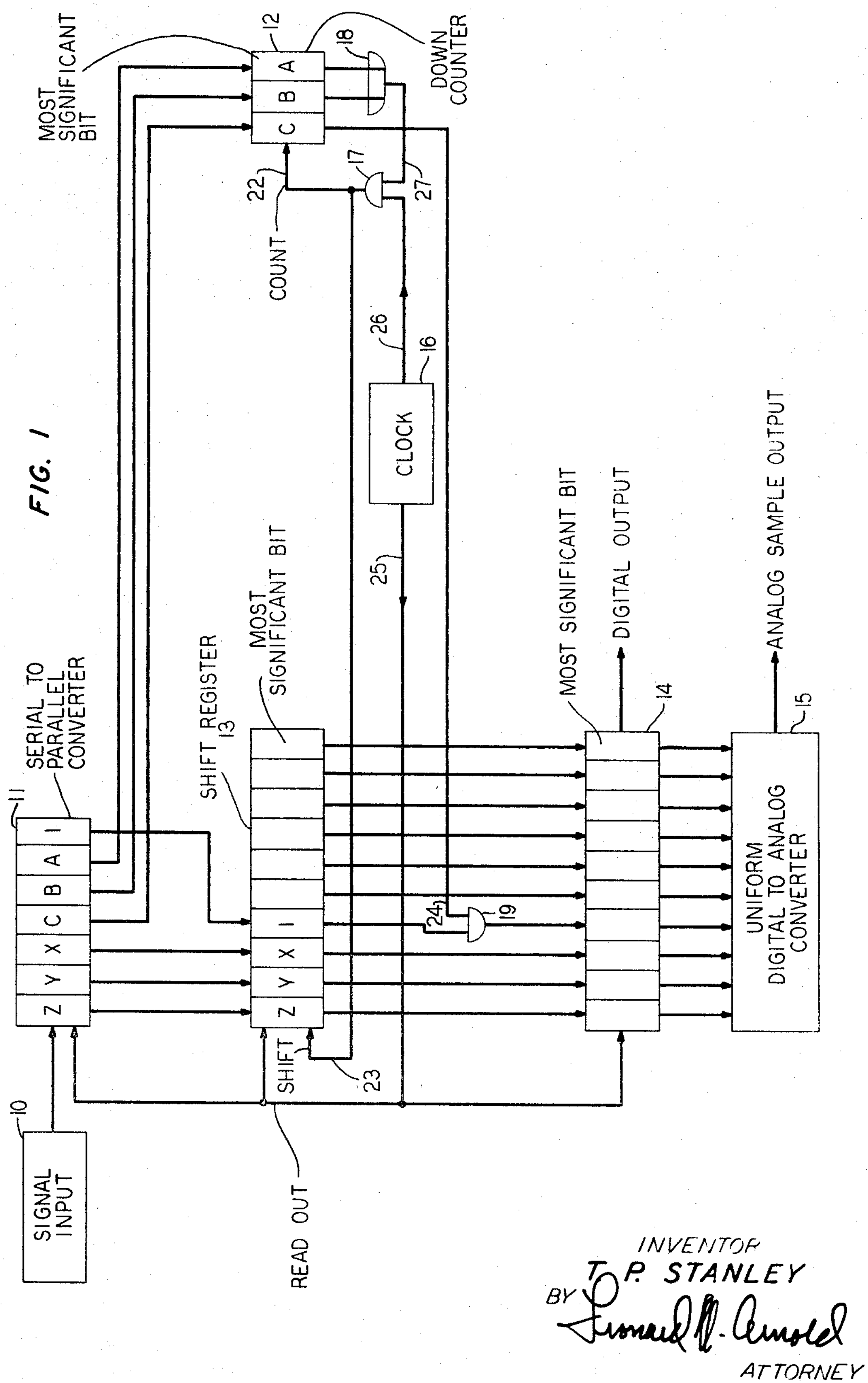
FIG. 1 is a block diagram of a digital expandor circuit embodying the present invention.

A digital expandor circuit embodying the present invention is shown in FIG. 1. In a complete system source 10 represents a distant transmitter, which has coded and compressed an analog information signal in accordance with a prescribed format. The expandor circuit shown in FIG. 1 receives the compressed digital words from source 10 and digitally expands them to their original predetermined length.

Briefly, the compressed words are first received in serial-to-parallel converter 11. One portion of each word is then transferred to counter circuit 12 and another portion is transferred to shift register 13. Counter circuit 12, together with clock 16 and logic gates 17, 18, and 19, control shift register 13 so that the digits are properly positioned and transferred to digital output circuit 14. The expanded digital words may be read out of digital output circuit 14 in digital form or they may be sent through uniform digital-to-analog converter 15 to produce the analog samples which are used to reconstruct the original information signal.

For purposes of illustration and concreteness of description it will be assumed that the input compressed words from source 10 contains six bits and that the desired digital output is a 10-bit word. In addition, it will be assumed that the first three bits of the compressed word form one group called the "characteristic," designated as bits A, B, and C, and that the second three bits form another group called the "mantissa," designated as bits X, Y, and Z. Each bit carries a quantum of information, which is indicated by the presence or absence of a pulse and represented in notion as a binary "1" or a binary "0," respectively. Bits A, B, C, X, Y, and Z, of course, may be either binary "1's" or binary "0's" as determined by the code transmitted from source 10.

Figure 2:
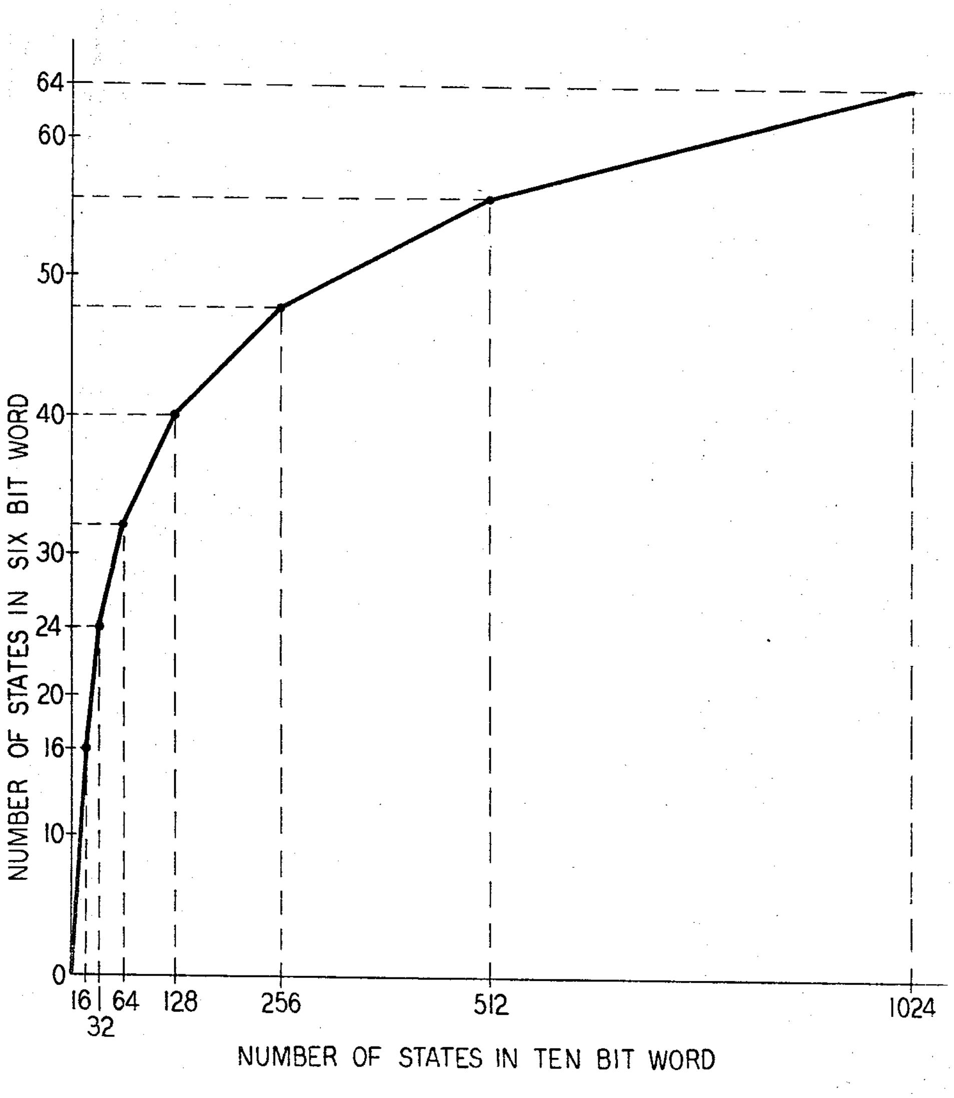
FIG. 2 is a graph illustrating the format used in the conversion of a 10-bit binary word to a six-bit binary word.

The nature of the signal supplied by source 10 may be more fully appreciated by examination of the graph shown in FIG. 2 and the numerical chart shown in FIG. 3. The graph in FIG. 2 shows how a 10-bit word is compressed to a six-bit word in accordance with the characteristic-mantissa format described above. The horizontal axis of the graph in FIG. 2 is scaled by the number of states, or different quantum levels, that may be represented with the original 10-bit word ($2^{10}-1=1,023$), and the vertical axis is scaled by the number of states that may be represented with the compressed six-bit word ($2^6-1=63$). The transformation from the 10-bit word to the six-bit word is accomplished on a piecewise linear basis as shown by the curve in FIG. 2. Each point on the curve indicates the number of states on the vertical axis that are used to represent the states on the horizontal axis. The breakpoints in the curve occur at points on the horizontal axis number 16, 32, 64, 128, 258, and 512. At these breakpoints, the slope of the curve decreases so that for every unit on the vertical axis a greater number of units are covered on the horizontal axis. The smaller units on the horizontal are given greater weight in the compression process, because the slope of the curve is steepest at the smaller units.

The effect of this kind of a conversion characteristic on the compression process may be seen by inspection of the numerical chart shown in FIGS. 3A and 3B. FIGS. 3A and 3B contain two columns of binary numbers representing decimal values from 0 to 80. The left-hand column of bits shows the decimal values represented as 10-bit binary words and the right-hand column shows the 10-bit binary words compressed into the six-bit characteristic-mantissa format described above. In the right-hand column, the first three bits, designated A, B and C, form the characteristic, while the second three bits, designated X, Y and Z, respectively, form the mantissa. It may be observed in the chart that the characteristic bits change at numerical values 16, 32, and 64. These points correspond to the breakpoints in the curve shown in FIG. 2. The effect of these breakpoints may be observed in FIG. 3 by noting that for numerals of value from 0 to 15 the 10-bit word is exactly matched by the digits in the six-bit word, while from numerical values 16 through 31, the 10-bit word is no longer exactly matched by the six-bit column. In fact, it may be observed for numerical values 16 through 31 that every second compressed word exactly matches the previous compressed word. This shows that some of the variations in the 10-bit word are not reflected by variations in the six-bit word. As the numerical value of the characteristic bits increases, the repetition of the digits in the six-bit compressed word becomes more pronounced. This may be observed by the fact that the numbers from 32 through 63 are repeated four times while the numbers from 64 through 80 are repeated eight times. This repetition of the numerals reflects the changing slope in the successive linear sections between the breakpoints of the curve shown in FIG. 2. The number of times each compressed word is repeated in any section can be easily determined by dividing the number of horizontal units by the number of vertical units represented on these scales between the breakpoints. While the numerical chart shown in FIG. 3 only includes the numerals from 0 to 80, this same format continues through the set of decimal values to 1,023. In this manner the original 1,023 input states, or input quantum levels, shown in the graph in FIG. 2, may be represented in a format which consists of only 63 different states. As indicated above, these six-bit compressed words are expanded to their original 10-bit format by the expandor circuit shown in FIG. 1.

In accordance with the invention, the compressed six-bit words shown in FIG. 3 from source 10 are read into serial to parallel converter 11. The characteristic bits, A, B, and C, are read from serial to parallel converter 11 into counter circuit 12, and the mantissa bits, X, Y, and Z, are read into shift register 13. Essentially, the characteristic bits carry information designating the position of the most significant binary "1" in the original 10-bit word while the mantissa bits carry information as to the nature of the three bits closest to the most significant binary "1" in the 10-bit word. A binary "1" which represents the most significant binary "1" in the 10-bit word is maintained in the extreme right-hand stage of serial to parallel converter 11. This binary "1" is read into the fourth stage of shift register 13 at the same time that the Z-, Y-, and X-bits are read into the first, second, and third stages respectively. The function of this binary "1" will be more fully appreciated from the discussion below.

Shift register 13 shown in FIG. 1 contains 10 stages which correspond to the 10 possible positions of the bits in the output 10-bit word. The least significant bit in shift register 13 is contained in the extreme left-hand or first stage, and the most significant bit is contained in the extreme right-hand or 10 stage. Thus the X-bit, which is read into the third stage, is a more significant bit in binary notation than the Y-bit, which is read into the second stage. It must be kept in mind that this order of arrangement of the bits, i.e., with the most significant bit on the right and the least significant bit on the left, is exactly the inverse of the order commonly seen with binary numerals expressed in written form, as shown by the chart in FIGS. 3A and 3B.

The output digital word in digital output circuit 14 is formed by the X-, Y- and Z-bits and the most significant binary "1," which are read into shift register 13. These four bits in shift register 13 are shifted as a group one stage to the right each time counter circuit 12 counts down one counting unit so that they are properly positioned to produce the expanded digital word. Clock 16 and logic gates 17 and 18 control the shifting and counting operation by responding to the characteristic bits which are read into counter circuit 12. By determining how many times counter 12 counts down, the characteristic bits also determine the number of times that the X, Y, Z and binary "1" bits are shifted in shift register 13. In effect therefore, counter 12 counts down, and shift register 13 shifts its bits to the right to produce output words of higher numerical value. AND gate 19 provides a special function, discussed in detail below, to determine selectively when the most significant binary "1" is to be read from register 13 to digital output circuit 14.

The expanded 10-bit word from the expandor circuit shown in FIG. 1 contains a maximum of four significant bits which will be represented by the X, Y, Z and binary "1" bits shown in shift register 13. Any binary "1" bits in positions less significant than the positions of these four bits are lost in the companding process. Thus, for example, if the original 10-bit word is "0001001011," corresponding to decimal value 76 shown in the chart in FIG. 3B, the four most significant bits are "1001," which will be represented in shift register 13 and digital output circuit 14 by the binary "1" and the X-, Y- and Z-bits, respectively. To position these four significant bits in the proper stages in shift register 13 they are shifted as a group three stages to the right. The two binary "1's" in the least significant positions of the original word will be lost in the companding process and will be replaced by binary "0's."

As indicated above, the shifting operation is controlled by the three-bit characteristic which is supplied to down counter circuit 12. The three-bit characteristic as a whole is capable of representing numbers of value from 0 to 7. These several values in effect determine the position of the most significant binary "1" in the expanded digital word. Thus, for example, a characteristic of value 0, represented by A, B and C bits of "000," means that the most significant binary "1" is contained in one of the first three least significant positions. A characteristic of number value 1, represented by A, B and C bits of "001," respectively, means that the most significant binary "1" in output circuit 14 should be in the fourth position from the left. Similarly, characteristics of number values 2 through 7, represented with A, B and C bits of "010" through "111," means that the most significant binary "1" in the output digital word in digital output circuit 14 is contained in the fifth through the 10th positions, respectively. The different numerical values of the characteristic bits have corresponding effects on the positioning of the binary "1" and the mantissa bits in shift register 13. Generally, it may be said that in all cases other than when the characteristic has a value of 0 the number of shifts undergone by shift register 13 is equal to one less than the decimal value of the characteristic bits. It may also be noted that the successive values of the characteristic bits correspond to the successive piecewise linear sections of the curve shown in FIG. 2. Characteristics of value 0 and 1 indicate that the conversion between the six-bit and 10-bit words is determined by the slope of the curve in the first section, while characteristics of value 2 through 7 indicate that the conversion process is determined by the slope of the second through seventh sections, respectively.

In the numerical chart shown in FIG. 3, the characteristic bits of the compressed words from source 10 change at decimal values 8, 16, 32,and 64. Generally, as indicated above, the expandor circuit shown in FIG. 1 accepts each of these compressed words in the right-hand column and transforms them to 10-bit words which match the four most significant bits of the original words shown in the left-hand column. The effect of each of the values of the characteristic bits on the operation of the expandor circuit shown in FIG. 1 is discussed in detail below.

When the characteristic bits are equal to "000," as shown for decimal values from 0 to 7 in the chart in FIG. 3A, the mantissa bits of the compressed word correspond identically to the bits in position one, two and three in the original 10-bit word. Under these circumstances shift register 13 need not shift and the mantissa bits X, Y and Z may be read directly to digital output circuit 14. Because characteristic bits A and B are equal to 0, OR gate 18 is not enabled and a pulse does not appear at input 27 to enable AND gate 17. Output 26 of clock 16 supplies a counting pulse signal to AND gate 17, and output 25 of clock 16 supplies a readout signal to serial-to-parallel converter 11, shift register 13, and digital output circuit 14. Since AND gate 17 is not enabled without a pulse at input 27, the pulse signal from output 26 of clock 16 does not reach input 22 to cause counter circuit 12 to count down and does not reach input 23 to cause the bits in shift register 13 to shift. Thus, when the signal appears at output 25 of clock 16 to read the bits out of shift register 13, the mantissa bits are read directly to output circuit 14 without having been shifted. In addition, since the C bit of the characteristic in counter circuit 12 is a binary "0," input 24 to AND gate 19 is not enabled. As a result the most significant binary "1" in shift register 13 is not read to output circuit 14 so that the proper output words are produced in accordance with the tables shown in FIG. 3A.

For signal inputs of decimal values 8 through 15, shown in FIG. 3A, the characteristic bits, "001," have a decimal value equal to 1. When this characteristic is read into counter circuit 12, OR gate 18 is again disabled because bits A and B are again equal to 0. Thus, counter circuit 12 does not receive a pulse at input 22 to count down, shift register 13 does not receive a pulse at input 23 to shift its bits one stage to the right, and mantissa bits, X, Y and Z, are again read directly to digital output circuit 14. However, since the C bit in the characteristic is a binary "1," a pulse appears at input 24 to enable AND gate 19. Because AND gate 19 is enabled, the most significant binary "1" in shift register 15 is also read to output circuit 11. By inspection of the digital output words corresponding to the input of value from 8 to 15 it may be seen that this "1" bit is necessary to produce the desired output.

Inspection of the signal inputs from decimal values 16 through 31 reveals that the characteristic bits are represented by bits of "010" and have a decimal value equal to 2. Accordingly, when these bits are read into counter circuit 12 the binary "1" of characteristic bit B enables OR gate 18 and activates input 27 of AND gate 17. This pulse at input 27 permits a signal from clock 16 to pass through AND gate 17, causing counter circuit 12 to count down one counting unit. After one down count the characteristic bits have a number value of one and are represented by A, B, and C bits of "001." Thus, OR gate 18 is no longer enabled and counter circuit 12 stops counting. During the counting cycle, however, a pulse was also transmitted from clock 16 through AND gate 17 to input 23 of shift register 13, causing it to shift its bits one stage to the right. As a result, when the signal from output 25 of clock 16 transfers the bits from shift register 13 to output circuit 14, these four significant bits will occupy positions numbered two, three, four and five. The X-bit in position four will be transmitted through AND gate 19, as is proper, because the C bit in counter circuit 12 will again be a binary "1" after the counter circuit counts down one count.

Similarly, inspection of the characteristic bits and the signal inputs of decimal value 31 through 63 in FIGS. 3A and 3B reveals that the characteristic bits A, B, and C are "011" and have a decimal value equal to 3. In this case, since the B bit is a binary "1," OR gate 18 will be enabled and a pulse will appear at input 27 to AND gate 17. When AND gate 17 is enabled, a signal from clock source 16 appears at inputs 22 and 23, causing counter circuit 12 to count down one count and the bits in shift register 13 to shift one stage to the right. After one down count, however, the characteristic has a decimal value of two and its A, B, and C bits are represented by "010." Because the B bit is also a binary "1" in this condition, AND gate 17 is again enabled and another signal from clock 16 is applied at inputs 22 and 23. Thus, counter circuit 12 counts down one more count and shift register 13 shifts its bits one more stage to the right. After this second count the characteristic bits have a decimal value equal to 1 and are represented by "001." Counter circuit 12 is not triggered for another count because OR gate 18 is no longer enabled. As a result, when the signal from output 25 of clock 16 causes the bits in shift register 13 to be transferred to output circuit 14, the four most significant bits occupy positions number six, five, four, and three as shown in FIG. 3B. AND gate 19 is again enabled because the C bit in counter 12 is a binary "1" at the end of the counting cycle.

The above process is continued in the same manner for cases in which the characteristic bits have higher decimal values. At decimal values 64, 128, 256, and 512 the characteristic bits become "100," "101,'"'110" and "111" respectively. Each of these higher value characteristics enables OR gate 18 and forces counter circuit 12 to count down an appropriate number of counts until its bits reach the "001" condition. This counting cycle simultaneously causes the bits in shift register 13 to shift the appropriate number of stages to the right. Thus, for example, a characteristic of "100" having a value of 4, enables OR gate 18 and AND gate 17 until the counter circuit has counted down three units. Under these conditions shift register 13 will shift its bits three stages to the right so that the four most significant bits will occupy the proper positions in output circuit 14. AND gate 19 is always enabled for the higher valued characteristics because counter circuit 12 always stops counting when the A, B and C bits are in the "001" condition.

Serial-to-parallel converter 11, counter circuit 12, shift register 13, digital-to-analog converter 15 and clock circuit 16 shown in the embodiment of the invention in FIG. 1 are well known in the art. Digital output circuit 14 may be conventional parallel-to-serial converter if a digital output is desired. When decoded analog samples are desired, digital output circuit 14 may be eliminated so that the digits from shift register 13 are transferred directly to converter circuit 15. In the alternative output circuit 14 may be replaced by a conventional storage circuit that transmits the expanded digital word to converter circuit 15 in response to the readout signal from output 25 of clock 16.

While the above described embodiment of the invention discloses a system in which the companding process is performed between a 10-bit expanded word and a six-bit compressed word, it should be understood that the invention is not restricted to these specific word lengths and that the techniques described may be easily adapted to compressed or expanded words of different predetermined lengths. In addition, while the embodiment described in FIG. 1 uses a format wherein the characteristic and mantissa bits in the compressed words are of equal length (three characteristic bits and three mantissa bits), it may be noted that the invention is not restricted to such a format and that, for example, the compressed six-bit word may contain four characteristic bits and two mantissa bits or two characteristic bits and four mantissa bits. The effect of these changes is merely to change the position and number of the breakpoints in the compression curve shown in FIG. 2.

Finally, it should be understood that the above described embodiments are merely illustrative of the principles of the invention. Various modifications in digital expandor circuits in accordance with the principles of the invention may be effected by persons skilled in the art without departing from the spirit and scope of the invention.

I claim:

1. A digital expandor circuit for effecting a nonlinear digital expansion of a compressed digital signal arranged in groups of pulses known as word groups, each word group having a first plurality of code digits called a characteristic and a second plurality of word digits called a mantissa comprising in combination:

- a shifting register having a plurality of stages equal to the number of digits in the expanded digital word;
- a counter circuit;
- means for reading a digit representing the most significant digit in said expanded word into said shift register;
- means for reading said mantissa into said shift register;
- means for reading said characteristic into said counter;
- means responsive to said counter circuit for controlling the shifting of said shift register so that said digit representing the most significant digit and said mantissa are positioned in the stages of said shift register corresponding to the positioning of the most significant bits in said expanded digital word;
- means responsive to said counter circuit for transferring digits from said shift register to the output of said expandor circuit; and
- means responsive to the least significant bit of the digits stored in said counter circuit for selectively inhibiting the transferral of said digit representing the most significant digit from said shift register to the output of said expandor circuit.

2. A digital expandor circuit for expanding an input binary word having a first group of bits which carry information as to the position of the most significant binary "1" in the expanded binary word and a second group of bits which carry information as to the character of the significant bits closest to the most significant binary "1" comprising in combination:

- a binary counter circuit;
- a shift register having a number of stages equal to the number of bits in the expanded binary word, each of the stages occupying positions which correspond to the position of the bits in the expanded binary word;
- means for reading said first group of bits in each of said input words into said counter circuit;
- means for reading said second group of bits in each of said input words in the stages of said shift register which correspond to the positions of the least significant bits in the expanded binary word;
- means for reading a binary "1" into said shift register in the stage corresponding to the position of the bit which is closest to and more significant than said least significant bits;
- means for providing a timing signal having a plurality of periodically occurring pulses for simultaneously activating said counter circuit and said shaft register, each of said pulses in said signal causing said counter circuit to count one binary unit in a predetermined counting cycle and said shift register to shift each of its bits to stages with positions which correspond to bits one step higher in significance;
- means responsive to said bits in said counter circuit for controlling said timing signal so that said shift register shifts its bits through a predetermined number of stages while said counter circuit counts a predetermined number of binary units;
- means for transferring the bits in said shift register to an output circuit; and
- means connected between said shift register and said output circuit for selectively inhibiting said most significant binary "1" when said bits in said counter circuit correspond to a predetermined binary code.

3. A digital expandor circuit for expanding an input binary word having a first group of bits which carry information as to the position of the most significant binary "1" in the expanded binary word and a second group of bits which carry information as to the character of the significant bits closest to the most significant binary "1" comprising in combination:

- a binary counter circuit;
- a shift register having a number of stages equal to the number of bits in the expanded binary word, each of the stages occupying positions which correspond to the positions of the bits in the expanded binary word;
- means for reading said first group of bits in each of said input words into said counter circuit;
- means for reading said second group of bits in each of said input words into the stages of said shift register which correspond to the positions of the least significant bits in the expanded binary word;
- means for reading a binary "1" into said shift register in the stage corresponding to the position of the bit which is closest to and more significant than said least significant bits;
- signal means for periodically activating said counter circuit and said shift register, each of said periodic signals causing said counter circuit to count one unit in a predetermined counting cycle and said shift register to shift its bits as a group to stages with positions which correspond to bits one step higher in significance in the expanded binary word;
- means for controlling said signal means such that said shift register is activated only when said counter circuit is activated;

means responsive to the character of the bits in said counter circuit for controlling the number of counts made by said counter circuit, said means permitting said counter to count in said predetermined counting cycle until the bits in said counter correspond to one of two predetermined binary codes;

means for transferring the bits in said shift register to an output circuit; and means connected between said shift register and said output circuit for selectively inhibiting said most significant binary "1" when said bits in said counter circuit correspond to one of said predetermined binary codes.